United States Patent [19]

Tsujimura et al.

[11] Patent Number: 4,883,391
[45] Date of Patent: Nov. 28, 1989

[54] BALL END MILL

[75] Inventors: Osamu Tsujimura, Kawasaki; Tatsuo Arai, Kitamoto; Masayuki Okawa, Kawasaki, all of Japan

[73] Assignee: Mitsubishi Kinzoku Kabushiki Kaisha, Tokyo, Japan

[21] Appl. No.: 247,347

[22] Filed: Sep. 21, 1988

[30] Foreign Application Priority Data

Sep. 24, 1987 [JP] Japan ............................ 62-145723[U]

[51] Int. Cl.⁴ ............................................... B23B 27/06
[52] U.S. Cl. ........................................ 407/40; 407/42; 407/48; 407/60; 407/62
[58] Field of Search .................. 407/113, 116, 48, 53, 407/103, 64, 65, 102, 104, 47, 57, 60, 61, 62, 40, 42

[56] References Cited

U.S. PATENT DOCUMENTS

| | | | |
|---|---|---|---|
| 4,132,493 | 1/1979 | Hosoi | 407/53 |
| 4,525,110 | 6/1985 | Stajanvski | 407/48 |
| 4,527,930 | 7/1985 | Harrom | 407/48 |
| 4,693,641 | 9/1987 | Tsyumura | 407/113 |

FOREIGN PATENT DOCUMENTS 0051775  5/1982  European Pat. Off. ............ 407/103

Primary Examiner—Robert P. Olszewski
Assistant Examiner—Blynn Shideler
Attorney, Agent, or Firm—Cushman, Darby & Cushman

[57] ABSTRACT

A ball end mill includes a body, an indexable cutter insert and a clamp screw. The body has a recess formed in a forward end portion thereof and a bore formed therein and opening to a bottom face of the recess. The bore includes a cylindrical portion disposed adjacent the bottom face and an internally threaded portion greater in diameter than the internally threaded portion. The insert includes a front face, a rear face and at least two convexly curved side faces. The front face has at least two convexly curved main cutting edges each defined by the intersection of a respective one of the curved side faces with the front face. The insert has an aperture formed therethrough and extending generally perpendicular to the rear face. The insert is releasably mounted in the recess with the rear face held in contact with the bottom face in such a manner that one of the main cutting edges is indexed in a cutting position. The clamp screw includes an externally threaded portion and a cylindrical engaging portion disposed coaxially with the externally threaded portion and being greater in diameter than the threaded portion. The clamp screw passes through the aperture of the insert and is received by the bore in such a manner that the externally threaded portion is threaded into the internally threaded portion while the cylindrical engaging portion is held in engagement with the cylindrical portion.

2 Claims, 2 Drawing Sheets

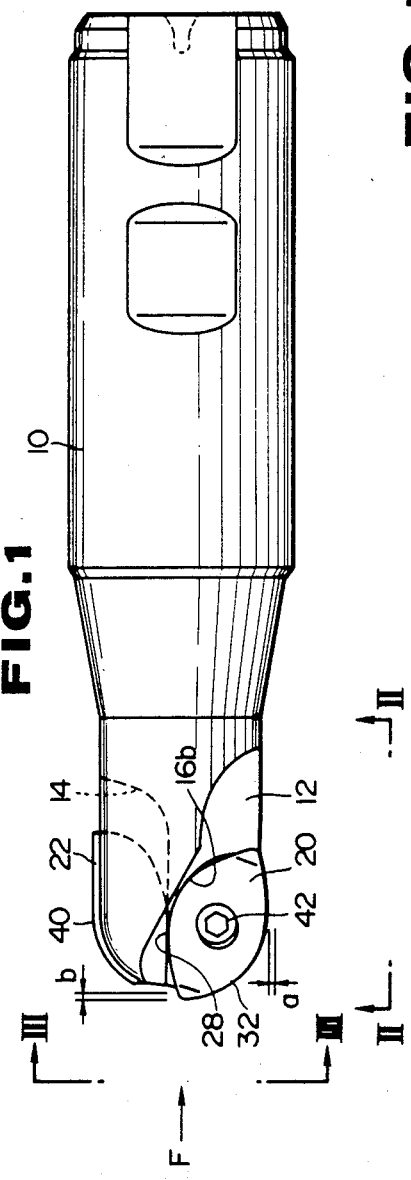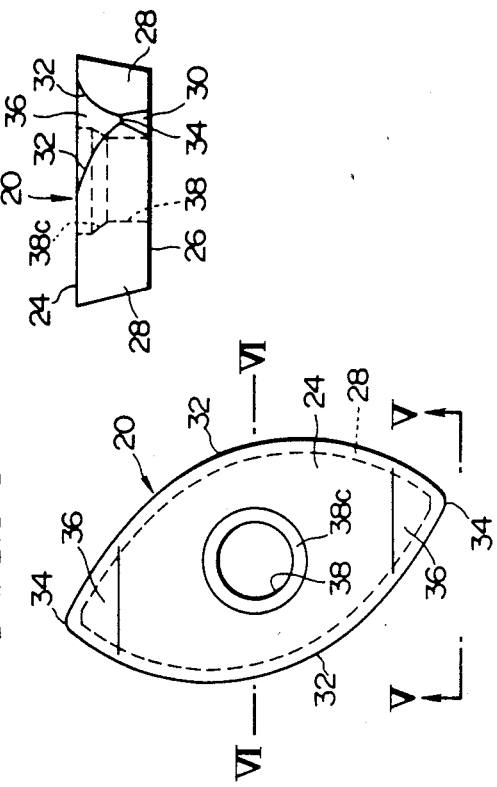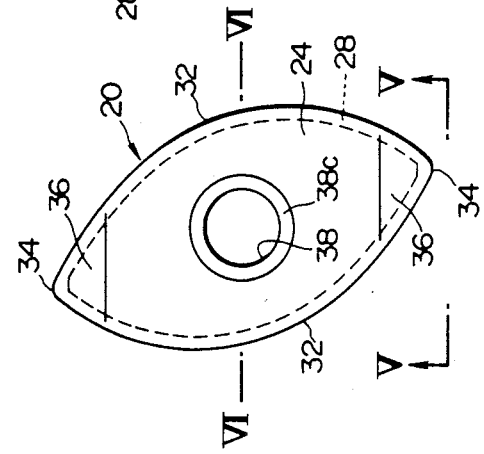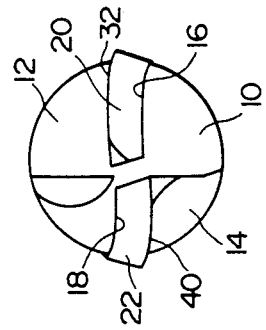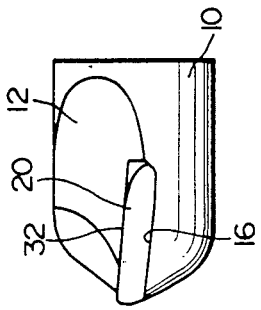

BALL END MILL

BACKGROUND OF THE INVENTION

1. Field of the Invention

The present invention relates to a ball end mill of the type having an indexable cutter insert with convexly curved cutting edges releasably attached to an outer periphery of a forward end portion of an end mill body.

2. Related Art

FIGS. 1 to 3 show one related art ball end mill of the aforedescribed type as disclosed in Japanese Utility Model Application No. 62-107230 of the same applicant.

The ball end mill includes a generally cylindrical end mill body 10 having a generally hemispherical forward end portion and a rearward end portion which is adapted to be fixedly secured to a machine spindle so that the end mill body 10 can be rotated about an axis therethrough. A pair of diametrically opposed chip pockets 12 and 14 are formed in the forward end portion of the end mill body 10, and a recess 16, 18 is formed in that wall surface of each chip pocket 12, 14 which faces in the direction of rotation of the body 10. Indexable first and second cutter inserts 20 and 22 are releasably mounted in the recesses 16 and 18, respectively.

Out of these two inserts, the first insert 20 is so disposed as to be slightly offset forwardly of the end mill body 10 from the second insert 22. As shown in FIGS. 4 to 6, the insert 20 comprises a plate of a generally elliptical shape defined by a front face 24, a rear face 26 disposed parallel to the front face 24, and two pairs of first and second side faces 28 and 30 disposed alternately and lying between the front and rear faces 24 and 26, each side face being sloping inwardly of the plate in a direction away from the front face 24. The two first side faces 28 as well as the two second side faces 30 are opposed to each other so as to be symmetrical with respect to an axis of the plate or insert. Each first side face 28 is convexly curved so as to assume a quadrant-like shape as viewed in a direction perpendicular to the front face 24 while each second side face 30 is planar and very short as compare with the first side face 28. Each first side face and each second side face intersect each other so as to define an obtuse angle therebetween. The insert has a pair of convexly curved main cutting edges 32 each defined by the intersection of a respective one of the first side faces 28 with the front face 24, and a pair of short cutting edges 34 each defined by the intersection of a respective one of the second side faces 30 with the front face 24. Each main cutting edge 32 has a leading end where it intersects one of the short cutting edges 34 and also has a trailing end where it intersects the other short cutting edge 34, and an angle defined by the short cutting edge 28 and a line tangent to the main cutting edge 26 at its leading end is obtuse. As will be apparent from FIG. 3 one of the short cutting edges 34 passes through the axis of rotation of the body 10.

The front face 24 serves as a rake surface for the cutting edges, and a marginal surface portion 36 thereof disposed adjacent to each short cutting edge 34 and the adjacent leading and trailing end portions of the main cutting edges 32 intersecting the short cutting edge 34 is convexly arcuate in such a manner as to slope toward the rear face 26 toward the short cutting edge 34, whereby the leading and trailing end portions of each main cutting edge 32 are convexly curved as viewed in a side elevation. The insert plate has a central aperture 38 formed therethrough and extending from the front face 24 to the rear face 26. The aperture 38 has a greater diameter portion 38a disposed adjacent to the front face 24, a reduced diameter portion 38b disposed adjacent to the rear face 26 and a tapered portion 38c connecting the larger diameter portion 38a and the reduced diameter portion 38b together.

The second insert 22 also includes a pair of convexly curved main cutting edges 40, but its construction will not be described in detail. Each insert 20, 22 is received in a respective one of the recesses 16 and 18 and releasably secured thereto by a clamp screw 42 in such a manner that one of the main cutting edges 32, 40 is indexed in a working position so as to extend slightly beyond the forward end portion of the body 10. As best shown in FIG. 7, the clamp screw 42 is inserted through the central aperture 38 of the insert and threaded into the body 10 with its head portion 42a held against the tapered portion 38c of the aperture 38 and with its threaded portion 42b threadedly engaged with a threaded bore 44 formed in a bottom face 16a of the recess 16. Further, the insert 20 is retained in position with the rear face 26 mated with a bottom face 16a of the recess 16 and with a portion of the first side face 28 defining the other main cutting edge 32 held in abutment with a portion of an arcuately shaped side wall 16b of the recess 16.

In the related art ball end mill as described above, since the leading end portion of the main cutting edge 32 is convexly curved as viewed axially of the end mill body 10, the cutting load increases gradually as the cutting operation proceeds, and therefore a great cutting load will not be exerted on the cutting edge 32 at a time. Besides, inasmuch as the angle defined by the short cutting edge 34 and the line tangent to the main cutting edge 32 at its leading end is obtuse, the indexed cutting edge 32 has an increased strength even at its leading end. Further, the ball end mill also has advantages that it possesses a better chip-disposal ability in comparison with conventional ball end mills.

In the related art ball end mill as described above, the portion of the side wall 16b of the recess 16 undergoes a cutting load F exerted on the insert 20 in an axial direction as shown in FIG. 1. If the insert should be of a triangular or quadrilateral shape, a bearing surface on which the load F is exerted perpendicularly could be formed on the side wall of the recess. However, inasmuch as the insert 20 is of an elliptical shape, such bearing surface cannot be provided. Accordingly, when the ball end mill is fed in the axial direction at a high speed, the insert 20 is pressed axially rearwardly of the body along the side wall 16b, and that portion of the cutting edge indexed in an end cutting position is caused to shift a distance b axially rearwardly of the body while that portion of the cutting edge indexed in a peripheral cutting position is caused to shift a distance a radially outwardly of the body. As a result, the cutting accuracy is unduly lowered particularly in the peripheral cutting position.

SUMMARY OF THE INVENTION

It is therefore an object of the present invention to provide a ball end mill in which a cutter insert is firmly retained so that the cutting accuracy is highly improved.

According to the present invention, there is provided a ball end mill comprising an end mill body including an axis of rotation therethrough and a recess formed in a forward end portion thereof and having a bottom face, the forward end portion having a bore formed wherein and opening to the bottom face of the recess, the bore including a cylindrical bore portion disposed adjacent to the bottom face and an internally threaded portion extending coaxially from the cylindrical bore portion, the cylindrical bore portion being greater in diameter than the internally threaded portion; an indexable cutter insert having a front face, a rear face and at least two convexly curved side faces lying between the front and rear faces, the insert having at least two convexly curved main cutting edges each defined by the intersection of a respective one of the convexly curved side faces with the front face, the insert having an aperture formed therethrough and extending generally perpendicular to the rear face, the insert being received in the recess with said rear face held in contact with the bottom face of the recess in such a manner that one of the main cutting edges is indexed in a cutting position, the front face serving as a rake surface for the indexed main cutting edges; and a clamp screw for releasably securing the cutter insert to the recess, the screw including an externally threaded portion and a cylindrical portion disposed coaxially with the externally threaded portion and being greater in diameter than the threaded portion, the clamp screw passing through the aperture of the insert and being received by the bore in such a manner that the externally threaded portion is threaded into the internally threaded portion while the cylindrical portion is held in engagement with the cylindrical bore portion.

BRIEF DESCRIPTION OF THE DRAWINGS

FIG. 1 is a front elevation of a related art ball end mill;

FIG. 2 is a side elevation of a part of the end mill of FIG. 1 as seen i direction indicated by the arrows II—II in FIG. 1;

FIG. 3 is end view of the end mill of FIG. 1 as seen in the indicated by the arrows III—III in FIG. 1;

FIG. 4 is a plan view of a cutter insert employed in the end mill of FIG. 1;

FIG. 5 is a side elevation of the insert of FIG. 4 as seen in the direction indicated by the arrows V—V in FIG. 4;

DESCRIPTION OF THE PREFERRED EMBODIMENTS OF THE INVENTION

Figure 6:
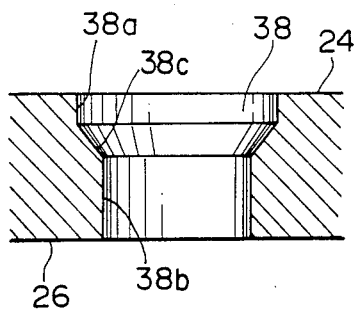
FIG. 6 is a cross-sectional view of the insert of FIG. 4 taken along the line VI—VI in FIG. 4.
Figure 7:
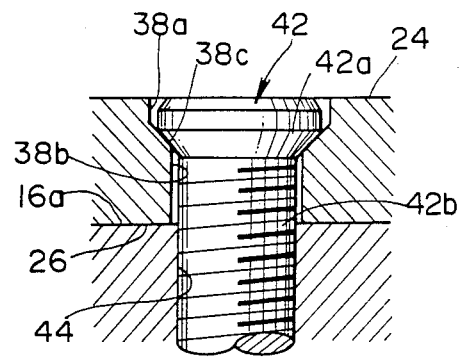
FIG. 7 is a cross-sectional view of a part of the end mill of FIG. 1.
Figure 8:
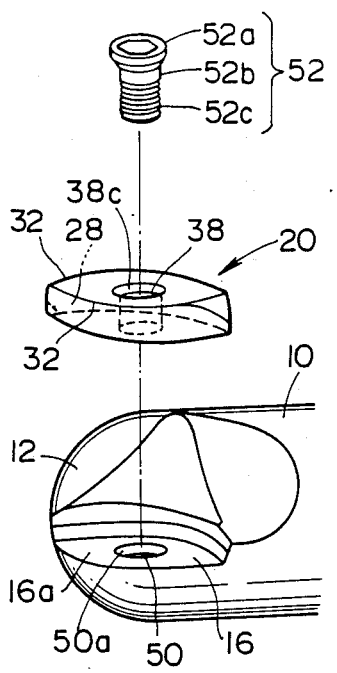
FIG. 8 an exploded view of a part of a ball end mill provided in accordance with the present invention.
Figure 9:
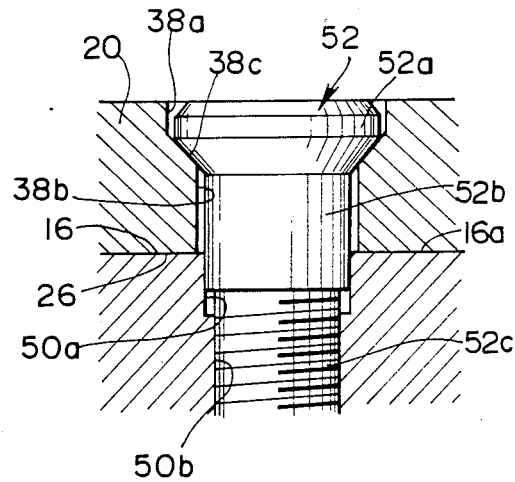
FIG. 9 is a cross-sectional view of a part of the end mill of FIG. 8.

Referring now to FIGS. 8 and 9, there is shown a ball end mill in accordance with the present invention. The ball end mill differs from the related art end mill shown in FIGS. 1 to 7 only in the mounting structure of the insert 20 on the end mill body 10, which will be described hereinafter.

There is formed in the bottom face 16a of the recess 16 a bore 50 which extends generally perpendicular to the bottom face. The bore 50 comprises a cylindrical bore portion 50a disposed adjacent to the bottom face and an internally threaded portion 50b extending coaxially from the cylindrical bore portion 50a, the cylindrical bore portion 50a being greater in diameter than the threaded bore portion 50b.

A clamp screw 52, which comprises a head portion 52a, a cylindrical engaging portion 52b disposed adjacent to the head portion 52a and an externally threaded portion 52c extending coaxially from the cylindrical portion 52b, is inserted through the aperture 38 of the insert 20 and is threaded into the bottom face of the recess 16, so that the insert 20 is releasably secured to the end mill body 10. More specifically, as shown in FIG. 9, the externally threaded portion 52c of the clamp screw 52 is threadedly engaged with the internally threaded portion 50b of the bore 50. The head portion 52a thereof is held against the tapered portion 38c of the aperture 38 to press the insert 20 toward the bottom face of the recess 16, and the lower portion of the cylindrical engaging portion 52b is held in firm engagement with the cylindrical bore portion 50a of the bore 50.

In the ball end mill as described above, insomuch as the cylindrical portion 52b of the mounting screw 52 is held in firm engagement with the cylindrical portion 50a of the bore 50, the insert 20 is firmly secured to the end mill body 10. Therefore, even if a great cutting load is exerted on the insert 20, the cutter insert 20 is positively prevented from being shifted during the cutting operation. As a result, even if the end mill is fed at a high speed in the axial direction, the cutting accuracy in the peripheral direction is hardly lowered.

Consequently, the ball end mill in accordance with the present invention, which has superior cutting strength and chip disposal ability as is the case with the related art end mill, makes it possible to conduct the high axial feed cutting with an enhanced cutting accuracy.

Obviously many modifications and variations of the present invention are possible in the light of the above teachings. It is therefore to be understood that within the scope of the appended claims, the invention may be practiced otherwise than as specifically described.

What is claimed is:

1. A ball end mill comprising:

an end mill body including an axis of rotation therethrough and a recess formed in a forward end portion thereof and having a bottom face, said forward end portion having a bore formed therein and opening to said bottom face of said recess, said bore including a cylindrical bore portion disposed adjacent to said bottom face and an internally threaded portion extending coaxially from said cylindrical bore portion, said cylindrical bore portion being greater in diameter than said internally threaded portion;

an indexable cutter insert having a front face, a rear face and at least two convexly curved side faces lying between said front and rear faces, said insert having at least two convexly curved main cutting edges each defined by the intersection of a respective one of said convexly curved side faces with said front face, said insert having an aperture formed therethrough and extending generally perpendicular to said rear face, and insert being received in said recess with said rear face held in contact with said bottom face of said recess in such a manner that one of said main cutting edges is indexed in a cutting position, said front face serving as a rake surface for said indexed main cutting edges; and a clamp screw for releasably securing said cutter insert to said recess, said screw including an externally threaded portion and a cylindrical engaging portion disposed coaxially with said externally threaded portion and being greater in diameter than said threaded portion, said clamp screw passing through said aperture of said insert and being received by said bore in such a manner that said externally threaded portion is threaded into said internally threaded portion while said cylindrical engaging portion is held in engagement with said cylindrical bore portion;

said aperture having a larger diameter portion disposed adjacent to said front face, a reduced diameter portion disposed adjacent to said rear face and a tapered portion tapering from said larger diameter portion to said reduced diameter portion, said clamp screw having a head portion disposed adjacent to said cylindrical engaging portion and having a tapered portion tapering to said cylindrical portion, said head being received in said larger diameter portion of said aperture with said tapered portion held in abutment with said tapered portion of said aperture so that when said screw is tightened, said head portion presses said insert against said recess, said bottom face of said recess facing generally in the direction of rotation of said body, said recess having a generally arcuate side wall facing axially forwardly and radially outwardly of said end mill body, said insert being of a generally ellipsoidal shape having a pair of convexly curved side faces, the side face cooperating with said front face to define the other main cutting edge being held in abutment with said side wall.

2. A ball end mill for axially feed and cross-feed cutting according to claim 1 in which said insert has at least two short side faces lying between said front and rear faces, said insert having at least two short cutting edges each defined by the insertion of a respective one of said short side faces with said front face, each of said main cutting edges having a leading end portion disposed at one end thereof and intersecting a respective one of said short cutting edges in such a manner that an angle defined by said leading end portion and said short cutting edge is obtuse, a portion of said cutting edge being disposed to pass through the axis of rotation of said body.

* * * * *